United States Patent
Kalandek (10) Patent No.: US 7,708,312 B2
(45) Date of Patent: May 4, 2010

(54) THREE-POINT SAFETY BELT SYSTEM WITH INTEGRAL AIR BAG

(75) Inventor: Bruce A. Kalandek, Dearborn, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 12/353,206

(22) Filed: Jan. 13, 2009

(65) Prior Publication Data

US 2009/0179407 A1    Jul. 16, 2009

Related U.S. Application Data

(60) Provisional application No. 61/021,023, filed on Jan. 14, 2008.

(51) Int. Cl.
   *B60R 21/18*   (2006.01)
(52) U.S. Cl. ..................................... 280/733
(58) Field of Classification Search ................ 280/733, 280/801.1, 807, 808
   See application file for complete search history.

(56) References Cited

U.S. PATENT DOCUMENTS

| | | | |
|---|---|---|---|
| 6,533,315 B2 * | 3/2003 | Brown et al. ................ | 280/733 |
| 2002/0125700 A1 * | 9/2002 | Adkisson ..................... | 280/733 |
| 2009/0051150 A1 * | 2/2009 | Murakami ................... | 280/733 |

* cited by examiner

*Primary Examiner*—Faye M. Fleming
(74) *Attorney, Agent, or Firm*—Markell Seitzman (57) ABSTRACT

A three-point safety belt system (20) including: a tongue (100) configured to receive portions of a safety belt assembly (200); the safety belt assembly (200) comprising a shoulder belt section (202) and a lap belt section (250), the shoulder belt section including a hollow, generally flat first tube or tubular section (202), the first tube or tubular part configured to tear apart along a preferred region (203), a web guide (300); a first and second retractor (240, 260); the lap belt section (250) extending from the tongue to the corresponding retractor (260) and the shoulder belt section (202) extending from the tongue to the other retractor (240), each retractor configured to respectively retract the lap belt section and the shoulder belt section and to permit the extension or protraction of same; an inflatable air bag (400) received within the shoulder belt section and movable with the first tubular part (202) of the shoulder belt section, and inflatable by an inflator causing the air bag to extend and break the first tubular part as the air bag inflates from a stored condition to an inflated condition.

15 Claims, 10 Drawing Sheets

THREE-POINT SAFETY BELT SYSTEM WITH INTEGRAL AIR BAG

This application claims the benefit of U.S. Provisional Application 61/021,023, filed on Jan. 14, 2008. The disclosure of the above application is incorporated herein by reference.

BACKGROUND AND SUMMARY OF THE INVENTION

The present invention relates to an occupant safety restraint system and more particularly to a system comprising a seat belt system in which a shoulder belt includes an inflatable air bag. In the prior art this type of restraint device was referred to as an "inflatabelt" or "inflataband."

Prior inflatable belt restraint systems used a narrow, tubular air bag which was located in the shoulder belt. The shoulder belt was configured as a tearable, hollow cover or tube which upon inflation of the air bag was broken, permitting the air bag to deploy across the chest of the occupant. The inflatable bag provided a resilient cushion protecting the occupant's chest area. These prior art inflatable belt systems lacked protection for the occupant's head. The combination of the tearable cover or tube and air bag make the shoulder belt rather thick (in comparison to a conventional shoulder belt) and it becomes difficult, if not impossible, to easily pull the shoulder belt over or across the web guide (D-ring) of the seat belt system.

The present invention solves the above deficiencies and comprises in the illustrated embodiment, a three-point safety belt system including: a tongue configured to receive portions of a safety belt assembly; the safety belt assembly comprises a shoulder belt section and a lap belt section, the shoulder belt section including a hollow, generally flat first tube or tubular part; the first tube or tubular part is configured to tear apart along a preferred region or line. The system further includes a web guide and at least one retractor and in the preferred embodiment a first and second retractor. The lap belt section 34 extends from the tongue to the first retractor and the shoulder belt section extends from the tongue to the second retractor. Each of the first and second retractor is respectively configured to retract the lap belt section and the shoulder belt section and to permit the extension or protraction of same. An inflatable air bag is received within and movable with the first tubular part. The air bag, which includes portions to protect the occupant's chest and head, and first tubular part comprise the shoulder belt section. The air bag is inflatable by inflation gas provided by an inflator causing the air bag to expand and break the first tubular part as the air bag inflates from a stored, folded condition to an inflated condition.

DETAILED DESCRIPTION OF THE DRAWINGS

Figure 1:
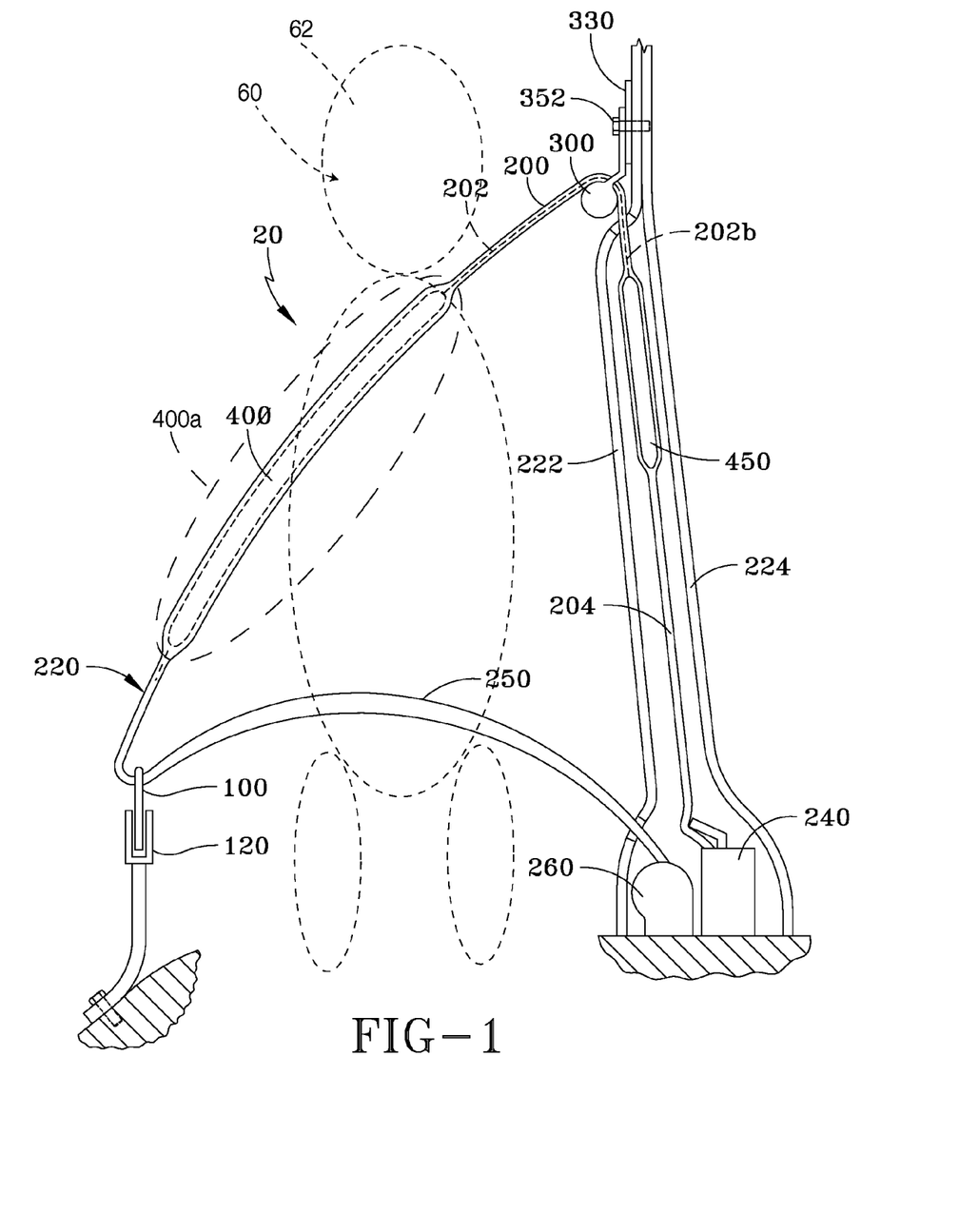
FIG. 1 shows the major components of a seat belt system utilizing the present invention with seat belt webbing extended.

Reference is made to FIG. 1, which shows the major components of the present invention, which includes a three-point occupant restraint system 20, which resembles a conventional seat belt 3-point system in that it uses at least one: seat belt, retractor, tongue, buckle and anchors. In FIG. 1 the system 20 is extended about an occupant 200 seated on a cushion of a vehicle seat; the seat is not shown. The occupant's head, body and lower legs are diagrammatically shown. System 20 functions as a seat belt system, as well as an air bag system, as the two are integrated into one protection system. The major components of system 20 are a tongue 100 (also shown in FIGS. 2 and 2A), a conventional buckle 120 of known variety configured to receive, lock with and release the tongue, a shoulder belt assembly 200, a lap belt 250, a shoulder belt retractor 240, a lap belt retractor 260, a web guide (also known as a D-ring) 300, and an optional height adjuster 330 to permit vertical adjustment of the web guide.

Each retractor 240 and 260 includes, amongst other items, a frame to rotationally support a spool about which the webbing is wound and unwound, and various locking mechanisms such as web sensitive and vehicle sensitive inertial locking mechanisms. The retractors are fixedly secured to the vehicle or vehicle seat. The shoulder belt assembly 200 differs from the conventional shoulder belt used in a seat belt system. The shoulder belt assembly 200 includes a hollow woven generally flat tube 202, a section of convention seat belt webbing 204 secured to one end of the flat tube 202 and secured at another end to the spool of retractor 240, an air bag 400 received within the tube (see for example FIG. 4B) and an inflator 450 operatively communicated to the air bag for inflating the air bag. The shoulder belt assembly and lap belt form part of a seat belt assembly 220. The lap belt extends from tube 202 to the spool of retractor 260. The hollow tube 202, which houses and protects the uninflated air bag 400, in the preferred embodiment, is a section of seat belt webbing woven as a flat tube with a tearable seam. The hollow tube is also referred to herein as a tubular section of seat belt webbing. The retractors 240 and 260, and inflator 450 are typically hidden behind some sort of molding 222 such as molding covering one of the vehicle pillars such as the B-pillar 224 of the vehicle.

Figure 1A:
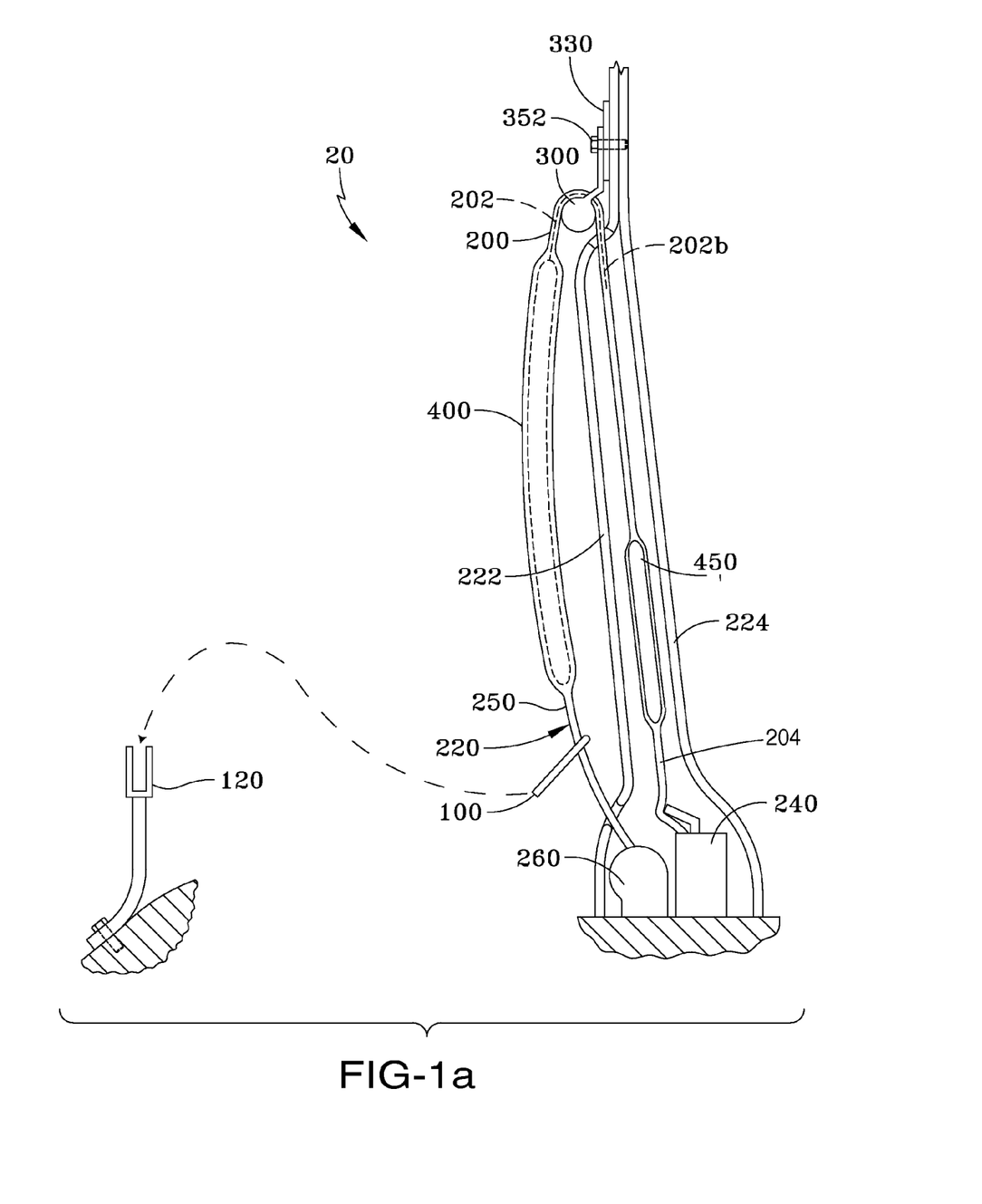
FIG. 1a shows these components with the seat belt webbing retracted.

As mentioned above one or more of the retractors can be secured to the seat. In FIG. 1 the shoulder belt assembly and lap belt have been extended outward away from their respective stowed positions. FIG. 1 shows the air bag diagrammatically, and also shows an inflated cushion zone 400a, which represents a region in which the inflated air bag would be located upon inflation. FIG. 1A shows the above components in their respective stowed positions.

Figure 2:
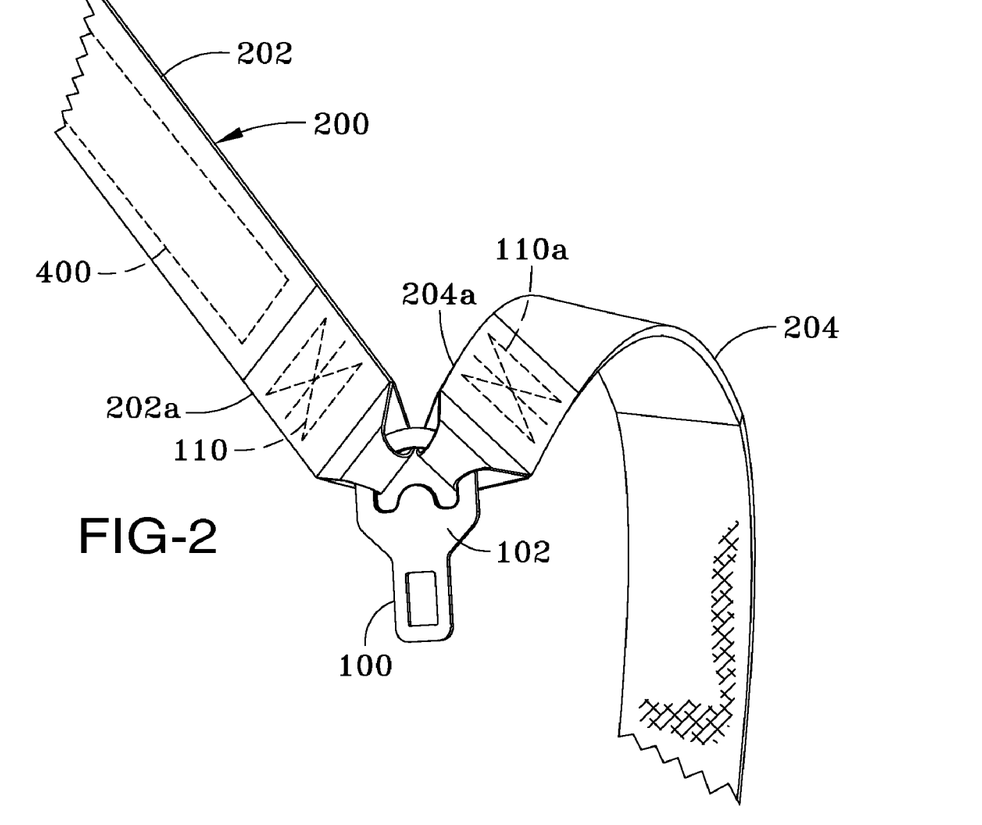
FIG. 2 shows a tongue attached to a shoulder belt and a lap belt.
Figure 2A:
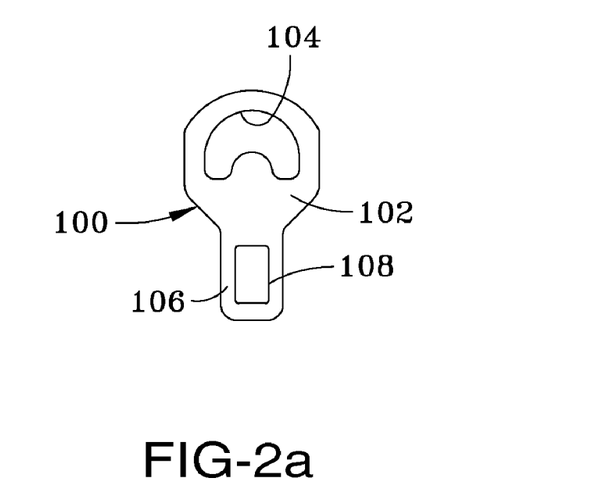
FIG. 2A shows the tongue in isolation.

As shown in FIG. 2, one end of the tube 202 forming the shoulder belt assembly 200 and one end of the lap belt 204 are connected to a seat belt tongue generally shown as 100. The tongue is received within a buckle 120 of known design (see FIG. 1) which is secured to a mounting surface such as a part of the vehicle or seat in a known manner. As can be appreciated, there are a number of different types of tongues and buckles that can be used with the present invention. As shown in FIGS. 2 and 2A, tongue 100 has a body 102 that includes a central curved aperture 104 with a narrowed end 106 having a rectangularly shaped lock aperture 108. The narrow end is received within a seat belt buckle 120 (see FIG. 1) and is locked to and released from the buckle by a conventional locking mechanism within the buckle. The buckle's locking mechanism enters opening 106. In regard to the connection of the shoulder belt assembly and lap belt to the tongue, the distal end 202a of tube 202 and end 204a of the lap belt are received in the aperture 104 and are each respectively folded over and secured by a plurality of sewing stitches generally shown as 110 and 110a.

Figure 3:
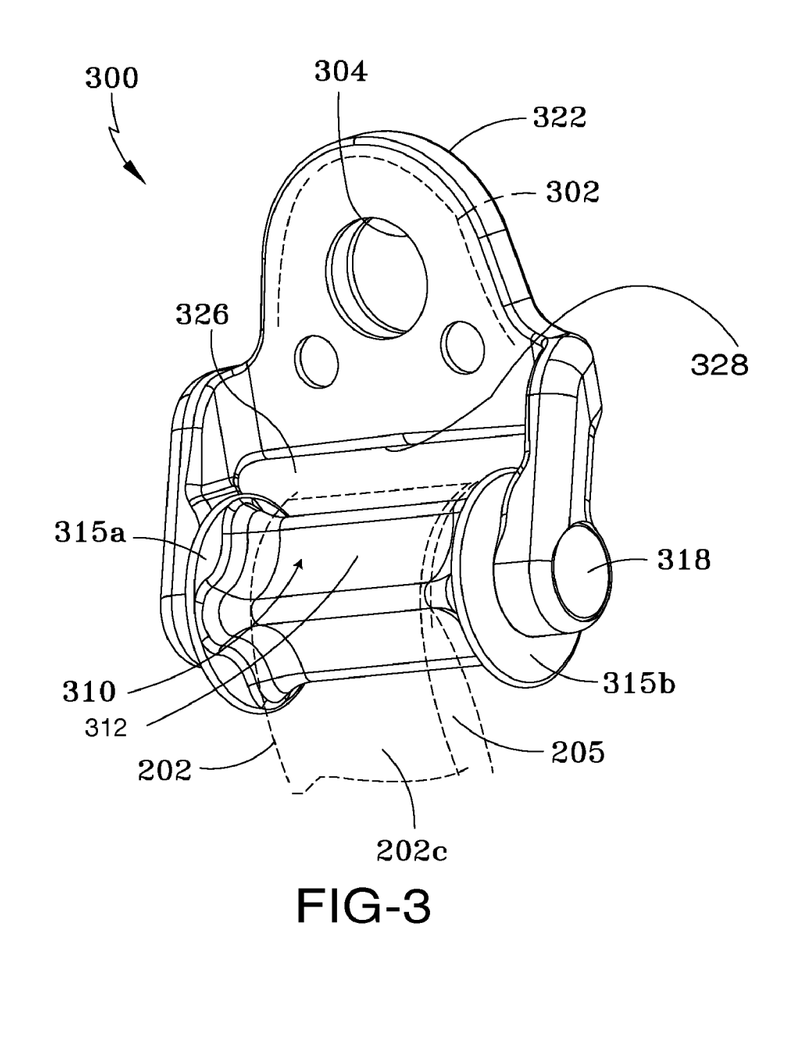
FIG. 3 is an isometric view of a web guide or D-ring of the present invention. The shoulder belt is shown in phantom line, in FIG. 3 passing through the web guide.
Figure 3A:
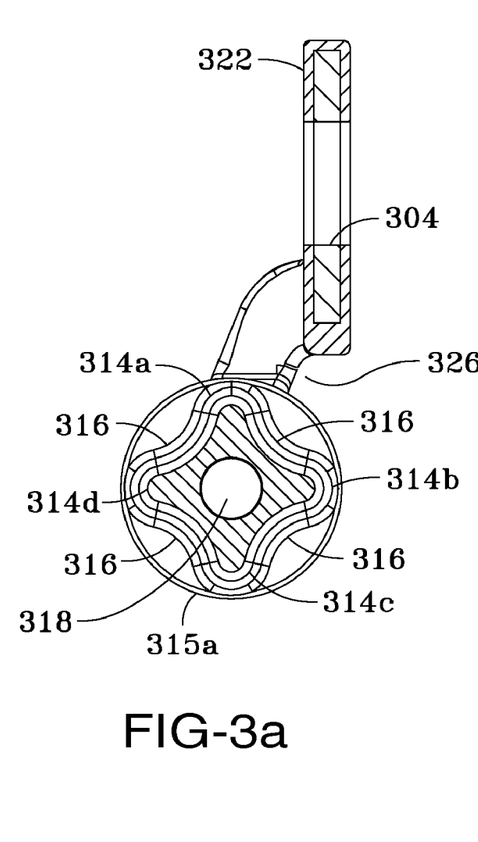
FIG. 3A is a cross-sectional view through a spool of the web guide.

Returning again to FIG. 1 as well as FIGS. 3 and 3A, it can be seen system 20 further includes a first anchor such as an articulating web guide, which is known as a D-ring 300. Amongst other components, the web guide 300 includes a weight-bearing frame 302 which is typically metal and may include a covering material 322 such as an over-molded plastic, and a fastener 352 such as a shoulder bolt (in FIG. 1). The web guide 300 rotates about a longitudinal axis of the fastener 352 and, if provided, can be moved vertically upon a track (of known type). The web guide 300 supports the shoulder belt assembly and particularly the tube 202 upon its exterior surface. As will be seen in greater detail below, the exterior surface is part of a spool that is rotatably supported by the frame 352. The center of the spool, in cross-section resembles a paddle-wheel and includes a number of radially extending spokes.

Figures 4, 4C:
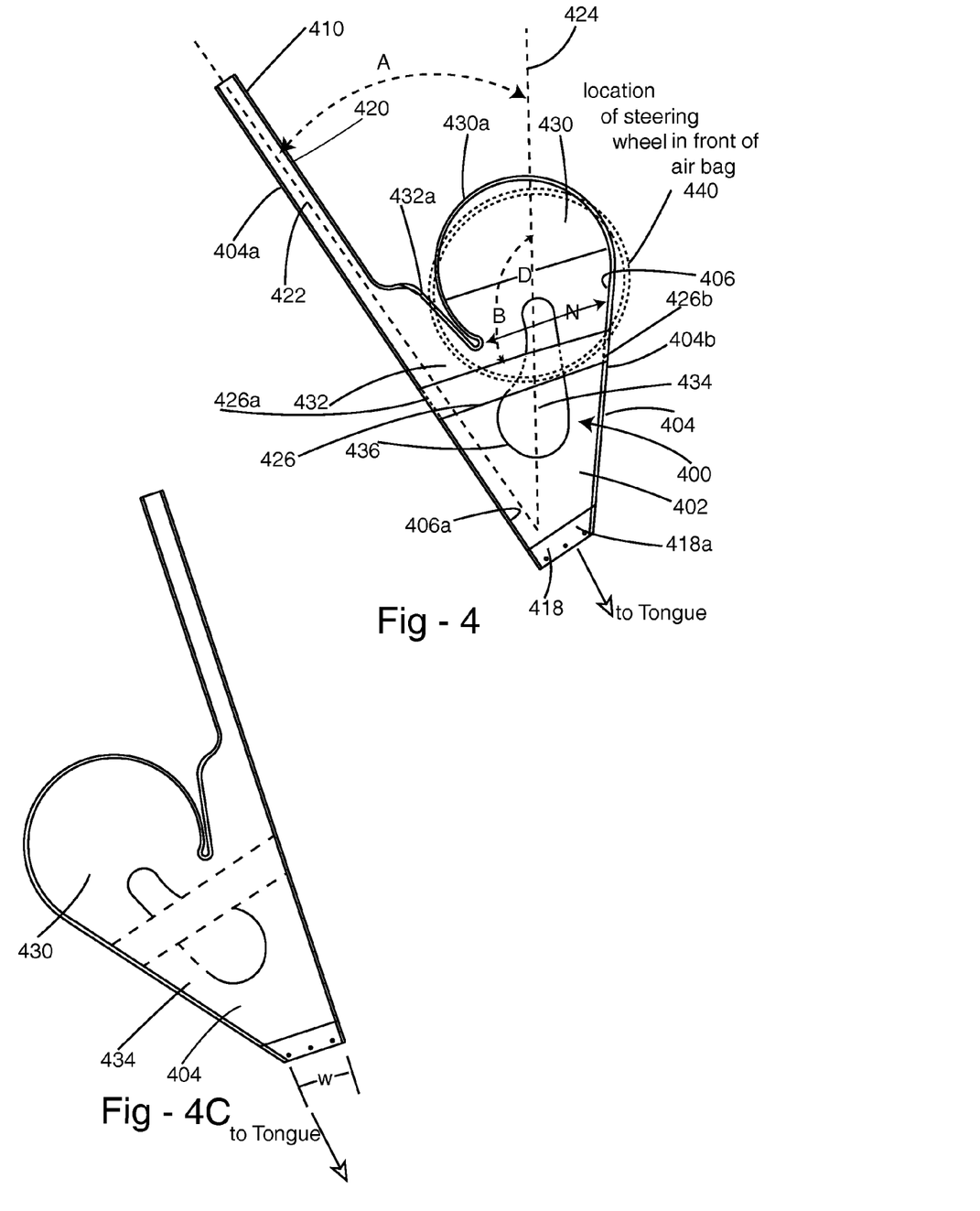
FIG. 4 is a plan view of a driver-side air bag according to the present invention.
FIG. 4C is an opposite plan view of the air bag of FIG. 4.
Figure 4A:
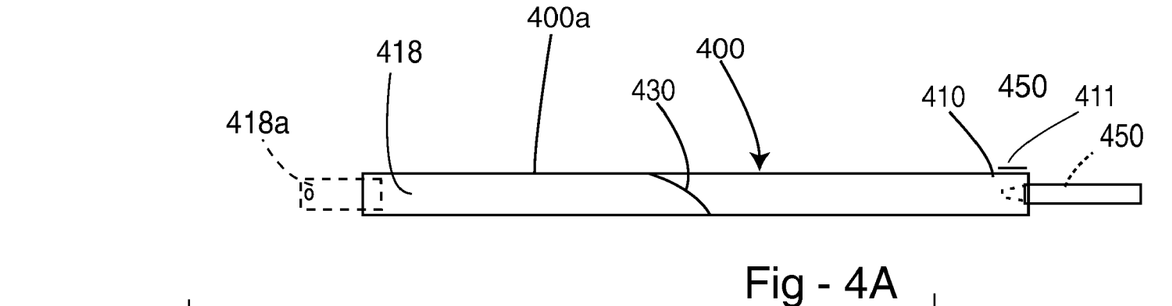
FIG. 4A illustrates a folded air bag with an inflator connected to the neck of the air bag.
Figure 4B:
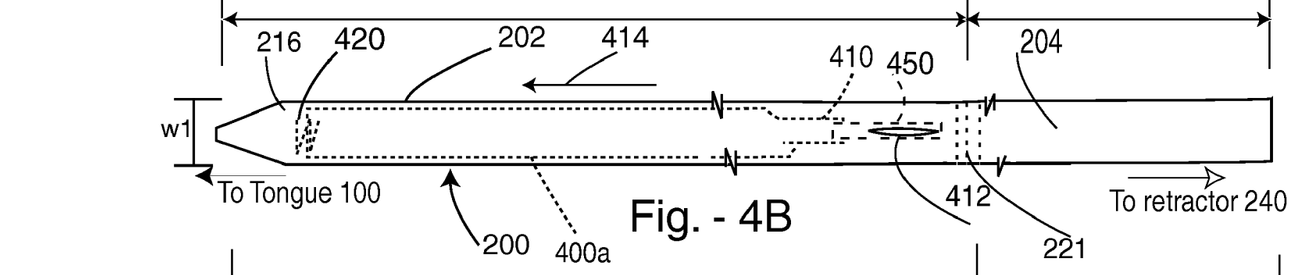
FIG. 4B shows a shoulder belt assembly with a folded air bag inside the shoulder belt assembly.
Figure 4D:
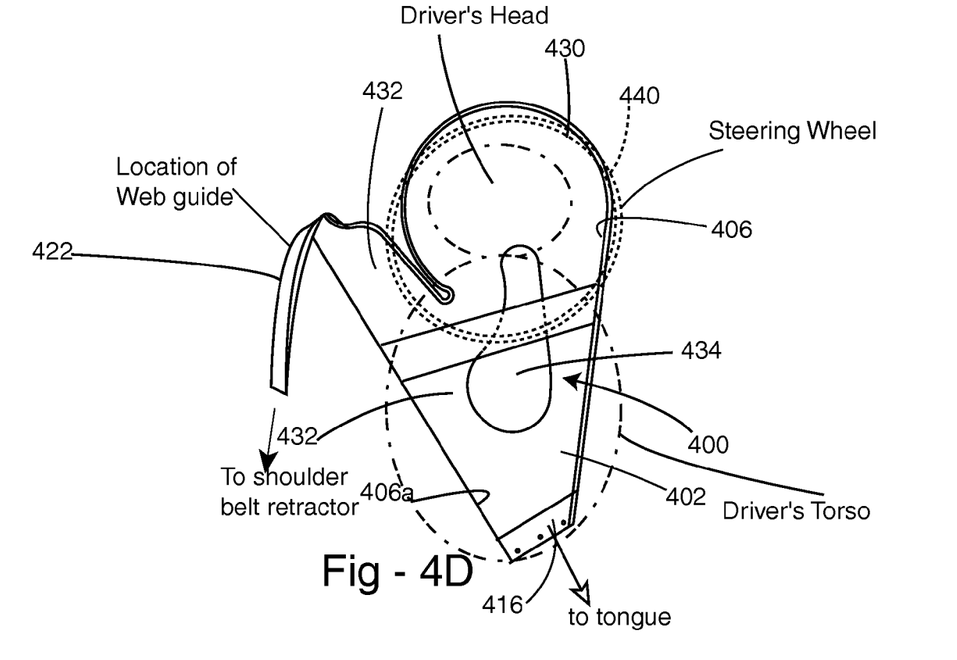
FIG. 4D diagrammatically shows an inflated driver side air bag with a shoulder belt assembly in the position traversing the location of a web guide; the web guide is not shown.

Reference is made to FIGS. 4-4D, which show various views of a driver-side air bag 400. FIG. 4 is a plan view of an air bag 400; the side or panel 402 of the air bag that is visible in FIG. 4 is the side that faces the driver during inflation. Numeral 404 represents the opposite side or panel of the air bag 400. The details of the construction of air bag 400 are discussed below. Air bag 400 is folded into a compact rectangular configuration such as shown in FIG. 4A; the folded air bag is referred to by numeral 400a. Inflator 450 is communicated to a neck region 410 of the air bag 400 either directly or through a tube (not shown). The inflator is appropriately sealed or clamped to the neck 410 to limit or prevent leakage; a clamp 411 is diagrammatically shown. Typically, band clamps have been successfully used to secure cylindrically shaped inflators to the neck of an air bag.

FIGS. 4 and 4D are substantially the same; however, FIG. 4D diagrammatically shows the shoulder belt assembly 200 bent over to show the configuration of a distribution passage that is bent over web guide 300 (which is not shown in this figure). The air bag 400 has a wedge or triangular shape with sides or edges 404a and 404b which converge toward end 418 as shown in FIG. 4. Side 404a partially defines the neck 410 as well as a narrow distribution tube, passage or second tubular portion 420 which extends inward from the neck; passage 420 is aligned to axis 422. Air bag 400 also includes an inflatable cushion 430, which is offset from the tube 420; the cushion 430 is substantially circular prior to being inflated and is more spherical when inflated. The center of cushion 430 is on an axis 424. As can be seen in FIG. 4, the circular cushion 430 is arranged at an angle A relative to the distribution tube portion 420. Axis 422 extends through the center of tube 420 and axis 424 extends upwardly through the center of the circular portion 430; the two axes 422 and 424 are separated by angle A. The exterior or side of the cushion 430 is designated by numeral 430a, and on one extreme thereof is tangent to side 404b. The narrow tube is communicated to the cushion 430 through a wider diameter section 432 having a side 432a. The lower extreme of section 432 extends down to end 418 and is bounded by sides or edges 404a and 404b. The airbag 400 can be configured where the narrow distribution passage 420 forms an inflatable second tubular portion which when uninflated is configured to lie flat, the second tubular portion including a first portion that extends at most the length of the air bag, the second tubular section includes a voluminous inflatable cushion extending angularly or generally perpendicularly, from the second tubular section below the second side of the second tubular section.

On the interior side of the cushion 430, that is the side closer to side 432a, it can be seen side 432a intersects the cushion 430 at an acute angle emphasizing the circularity of the cushion 430. The intersection of the side 432a with cushion 430 creates a necked-down region 432b in the cushion 430 with a dimension, N, smaller than the diameter D of the circular cushion 430. End 418 will be formed of opposing layers of air bag material. An air bag with the shape shown in FIG. 4 can be made by a technique known in the art as one-piece-weaving (OPW) in which the entire air bag is fabricated on a loom. In practice, depending on the width of the loom and the dimension of the air bag, multiple air bags are often created simultaneously on the loom. Each air bag is cut out from adjacent woven fabric along a border which separates one air bag from the next. Alternatively, the air bag can be made using conventional sewing techniques, utilizing a main panel that is folded over a center seam and sewn together to obtain the shape of the air bag shown in FIG. 4. Numerals 406 and 406a illustrate the location of stitches that would be used to sew the air bag main panel together.

To reduce the volume of the inflatable air bag, air bag 400 includes a non-inflatable region 434 defined by a seam or woven joint 436. In FIGS. 4 and 4D the air bag 400 is laid out in the orientation it would have when inflated. In these figures the inflatable cushion 430 is shown above the steering wheel 440.

As previously mentioned the shoulder belt assembly includes a tubular section 202 and a flat section 204 of woven belting and the folded air bag 400a is moved into the tubular section 202. In practice the width of the shoulder belt assembly (that is the width of the flattened tubular section 202) will be about 5.5 cm (about 2⅛ inch) which is the width of a typical conventional seat belt. The tubular portion 202 includes a slot or elongated opening 412 as shown in FIG. 4B. The folded air bag 400a, with or without inflator 450 attached thereto, is inserted through opening 412 and pulled or pushed toward end 216 of tube. The details of the folding of the air bag are discussed below.

Reference is briefly made to FIG. 4. End 418 of the air bag is wider than the width of the tubular section 202 and needs to be folded to a width slightly less than the width of the flattened tubular section. End 216 of tube 202 can initially be open and a thin tool or rope or wire inserted therein and attached directly to a folded-over, narrowed end 418 of the air bag. The folded air bag 400a can then be pulled down the tubular portion 202 of the shoulder belt assembly 200. Alternatively, the folded air bag 400a, if sufficiently rigid, can be pushed up the tubular portion 202. End 418 of the bag can be tacked in place, in the tube, by a series of stitches 420. Subsequently, end 216 of tube 202 is narrowed by folding-over and this narrowed end is inserted into the opening 104 of the tongue 100 and secured thereto. FIG. 4A shows an alternate embodiment of the invention. A length of seat belt material 418a (single, double, etc) can be sewn to the folded end 418 of the air bag 400. This extra material 418a increases the stiffness of end 418 making it easier to push the air bag into the tubular portion. Alternatively, the tool, rope or wire can be secured to the extra material 418a pulling the folded air bag into the tubular section 202, thereby avoiding stressing the air bag material directly.

Reference is again made to FIGS. 4 and 4D. Air bag 400, on side 402 which faces the driver, includes an additional band of material 426, which extends across inflatable portion 432 and the non-inflatable region 434. Band 426 is secured to the side or panel 402 at seams or joints 426a and 426b. The band 434 is positioned at an angle B which is 110 degrees and can be in the range of about 100 to 120 degrees. Band 426 aids in preventing side 404b from bending in a direction toward the steering wheel 440 during inflation of the air bag 400. As section 432 inflates it pushes upon the band 426 placing it in tension, which is exerted on seam 426b, which resists side or edge 404b from bending forward toward the steering wheel.

If the inflator 450 is secured to the folded air bag, the inflator will be pulled through or toward the slot 212. After the folded air bag is in its place in the tubular section, the inflator 450 is manipulated to fit inside the tubular portion of the shoulder belt assembly. If the inflator is not initially connected to the neck of the air bag 400, after the folded air bag 400a is in place, the inflator 450 is secured to the neck 410 and placed in the tubular portion through the slit 214. The flat woven section 204 of the shoulder belt assembly 200 is secured to the spool of retractor 240.

In the illustrated embodiment the inflator 450 is movable with the shoulder belt assembly 200 (and air bag 400 as well as the tubular portion of seat belt webbing). Reference is briefly made to FIG. 1A which shows the system 20 in a stowed condition with the seat belt 204 wound about retractor 240 and the lap belt 250 wound about retractor 260. As can be seen, the inflator 450 is represented as being closer to retractor 240 in FIG. 1A than as shown in FIG. 1 as the rewind springs in each retractor has rewound portions of belt 204 and 250 thereon. The inflator acts as a weight or pendulum which assists in pulling the shoulder belt assembly downward and aids in rewinding of the shoulder belt assembly onto retractor 240. The inflator is protected by the tubular portion 202 of the shoulder belt assembly. As can be seen in FIGS. 1 and 1A, the end 202b of the hollow seat belt webbing 202, the inflator 450 and the length of seat belt webbing connected to tube 202 are configured to move generally vertically within a vertically extending piece of trim 222. In another embodiment of the invention, inflator 450 can be fixedly secured to a seat belt frame or to a portion of the vehicle such as one of the pillars or roof rail and connected to the air bag by a flexible tube; in this embodiment the inflator does not act as a weight.

Figure 4E:
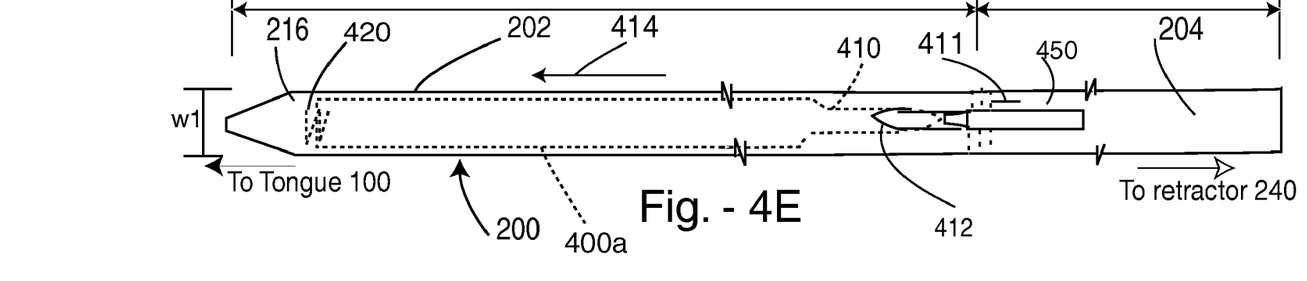
FIGS. 4E and 4F show an alternate embodiment of the invention.
Figure 4F:
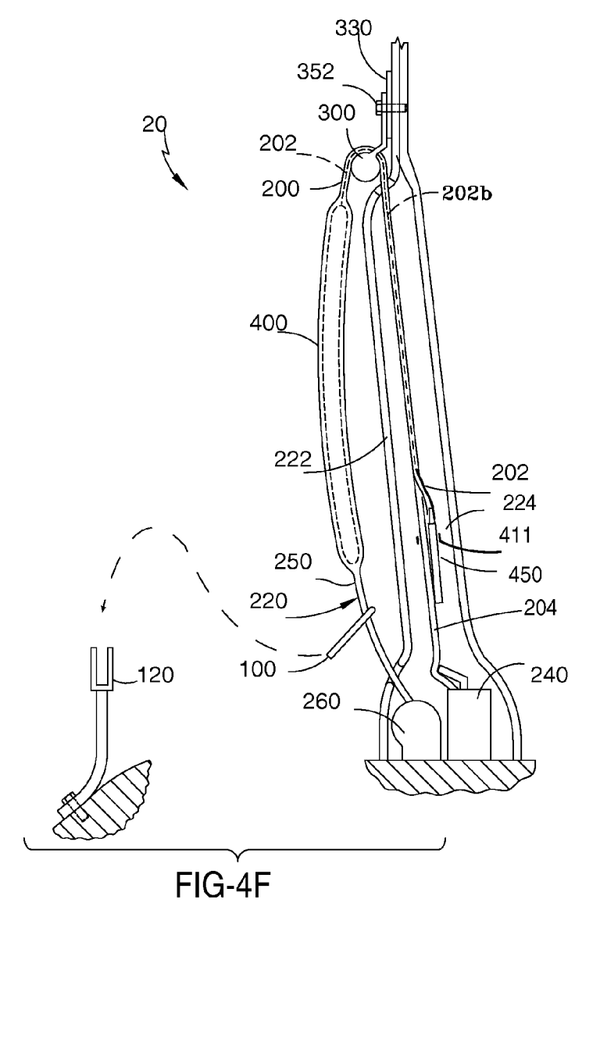

Reference is made to FIGS. 4E and 4F which show an alternate embodiment of the invention. In these figures the inflator 450 is shown outside of the tube 202. The neck 410 of the air bag 400 extends out of the tube 202 through opening 412. Inflator 450 is clamped to the extending neck 410 by a clamp or other similar device. To prevent the inflator 450 from swinging relative to the seat belt 204 and to tube 202, inflator 450 is clamped or otherwise secured to the seat belt or adjacent portion of tube 202.

Figure 5:
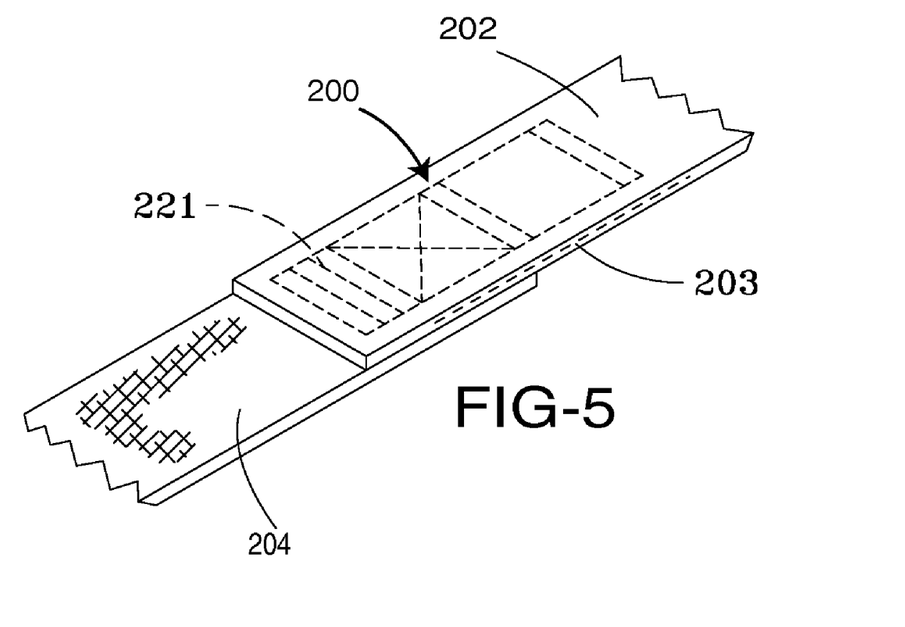
FIGS. 5 and 5A show two versions of a shoulder belt assembly.
Figure 5A:
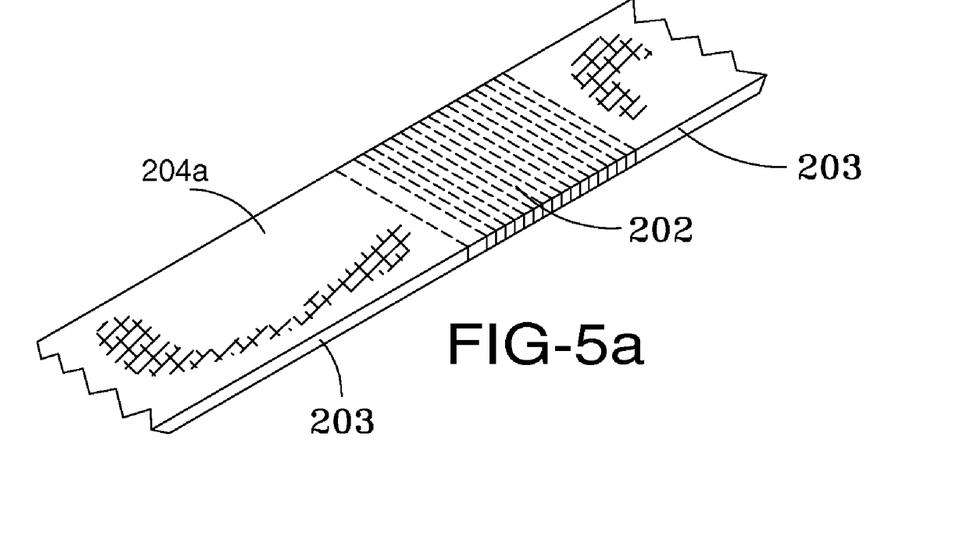

Reference is briefly made to FIG. 5 which illustrates one version of the shoulder belt assembly 200 comprising the hollow sleeve which is woven to lie flat, and a section of conventional flat seat belt webbing. An edge of the tubular section is woven to include a tearable seam 203. In this version the distal ends of these two sections of webbing are overlapped and joined together by sewing stitch patterns 221. As can be appreciated, a detriment of this type of construction is this shoulder belt assembly is extremely bulky and it is very difficult, if not impossible, for it to traverse the D-ring 300. FIG. 5A illustrates the preferred construction of the shoulder belt assembly in which the tubular portion 202 and the flat portion 204 are woven seamlessly together. The tubular portion 202 is woven to lie flat and includes a tearable seam 203, along an edge, which is opened as air bag 400a inflates.

Figures 6, 6A:
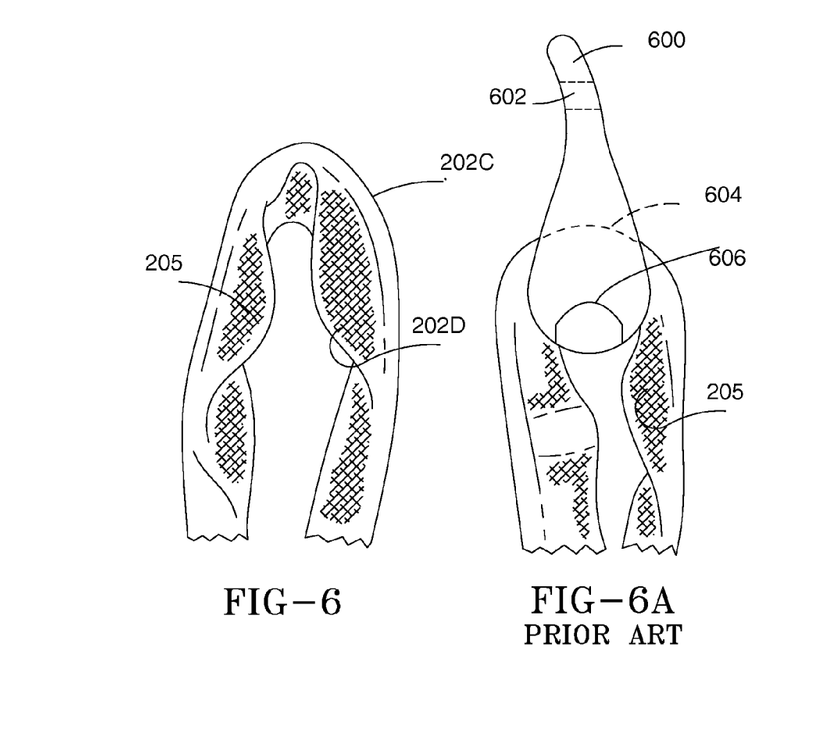
FIG. 6 is a plan view showing characteristics of a folded-over shoulder belt assembly.
FIG. 6A shows the shoulder belt assembly of the present invention passing through a prior art web guide.

FIG. 6 is a side-plan view diagrammatically illustrating the shape taken by the tubular section 202 of the shoulder belt assembly 200, with an air bag 400 placed therein, when bent, for example, over a support surface of a D-ring. The tubular section forms two distinctive profiles, the outer surface 202c of the tubular section 202 being generally smooth while the inner surface 202d becomes formed into a series of waves, undulations or ripples 205. It is thought this form is realized as the outer surface is at a higher tension than the inside surface. When the shoulder belt assembly, such as that shown in FIG. 6, is pulled through the conventional web guide 600 shown in FIG. 6A, the undulations, which increase the effective thickness of the tubular section, substantially increase the force needed to pull the shoulder belt in either direction.

The prior art web guide 600 includes a frame with a first opening 602 for a fastener or bolt; the web guide of this type also includes a narrow opening 604 through which the shoulder belt assembly is received. The inner surface of the shoulder belt assembly is supported upon a seat belt supporting surface 606. As the shoulder belt assembly is extended and attempted to be retracted onto the retractor 240, the inner surface of the belt slides over surface 606. Because of this increased force level to move to the shoulder belt through the conventional web guide, the seat belt retractor 240 must be manufactured with a significantly stronger return spring to pull the seat belt through the D-ring. Utilizing a higher level of return spring creates a greater, sometimes objectionable, force on the shoulder of an occupant.

Figure 3B:
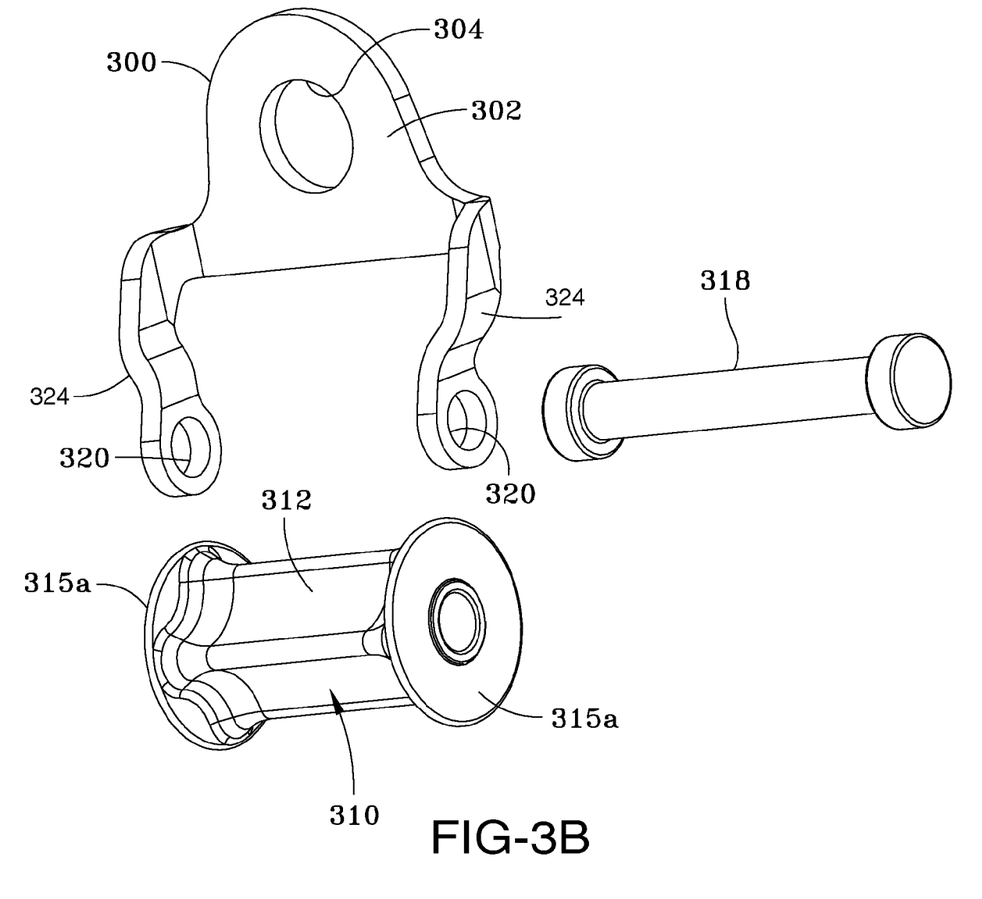
FIG. 3B is an exploded view of the web guide of FIG. 3.

Reference is now made to FIGS. 3-3B which show features of an improved web guide or D-ring 300. The web guide or D-ring 300 includes a frame or body 302 having a fastener opening 304. Fastener 356, as mentioned, is used to mount the frame to a stationary location or to a movable carrier. A rotor or spool 310 is rotationally supported by the frame 302; the spool 310 includes a central bobbin 312 with a plurality of paddles or projections 314a, b, c and d extending therefrom. In the preferred embodiment, there are four such projections 314a-d. The spool 310 can also include end sections 315a and 315b which operate to confine the shoulder belt assembly 200 within the geometry of the spool 310 in the manner as done in conventional seat belt retractors. As can be seen from FIG. 3A, the outer surface of the spool or bobbin of the present invention includes a number of voids or undulations 316 between adjacent projections. These voids 316 are of sufficient size to accept the undulations 205 formed on the underside of the tubular shoulder belt section 202. The spool 310 is supported on the frame 302 by an axle 318; the axel is received about bushings 320 in opposing legs 324 of the frame. The frame can be covered by an elastomeric covering material shown as 322. The legs 324 position the spool 310 a sufficient distance 326 from an edge 328 of a center portion of the frame to enable the tubular section 202 including its undulations to pass therebetween.

Figure 3C:
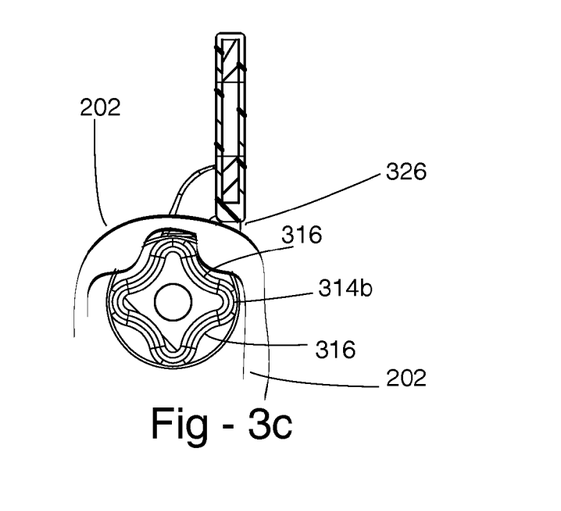
FIG. 3C superimposes a shoulder belt on the cross-sectional view of FIG. 3A.

During non-emergency operation, system 20 operates as a conventional three-point seat belt system. During this time the shoulder belt assembly 200 and more particularly tubular portion will move through the web guide 300 as the seat belt system is buckled about the driver, or as the driver moves between the various seated positions. FIG. 3C is representative of this normal, non-emergency operation. Here, the tubular section 202 with undulations 205 is shown passing through spacing 326 of the web guide, between the covering material 322 and the spool 310. One of the undulations 205 is shown in contact with a projection 314a. The illustrated undulation 205 as it moves, for example to the right in FIG. 3C, engages projection 314a and rotates spool 310 accordingly. By providing the projections 314a-d and the adjacent voids, cavities or spacing 316a-d which receive the undulations 205 formed in the belt, the force needed to move a shoulder belt assembly 200 through a web guide is lessened in comparison to the prior art and made significantly more uniform.

Reference is made to FIGS. 1 and 4D which are useful in describing the operation of the system 20 as an air bag system. As previously mentioned, FIG. 1 illustrates the orientation of the various parts of system 20 with the shoulder belt assembly 200 and lap belt 250 secured about the driver (shown schematically with oval shapes). During a low level crash both seat belt retractors will automatically enter their respective locked mode of operation respectively, preventing protraction of the lap belt and the shoulder belt assembly, thereby effectively restraining movement of the occupant (in this case the driver). During a higher level crash both seat belt retractors also enter into their locked mode of operation; additionally inflator 450 is activated and inflation gas is communicated into the neck 410 of the air bag. As air bag 400 fills passage 420 and volume 432, the tubular portion 202 breaks apart permitting further expansion of the air bag.

As can be appreciated from FIG. 4D, the inflatable portion or volume 432 will extend across the driver's outside shoulder, across the driver's chest and end approximately at the driver's inner hip bone as is the case with a conventional shoulder belt. During the emergency, inflatable portion 432 mainly provides protection for the occupant's chest and torso. Inflation of the air bag along axis 422 fills portion 432 of the air bag into a generally cylindrical shape essentially extending from the web guide to near the seat belt buckle and properly orients the cushion 430. Further inflation of the air bag causes the circular cushion portion 430 to expand from its folded condition and to be placed in the orientation as illustrated in FIG. 4D, which is somewhat elevated from inflatable portion 432. Cushion portion 430 will be positioned generally between a typical sized driver's upper shoulder and head 62 and steering wheel of the vehicle to protect these portions of the occupant. After air bag 400 deflates the shoulder belt assembly will not be able to move easily through the D-ring 300, however, the system will be functional to protect the driver if the vehicle is drivable to a repair facility. The strap or material 426 maintains cushion portion 430 in proper alignment preventing same from moving forward into the steering wheel prior to contact with the driver.

Many changes and modifications in the above-described embodiment of the invention can, of course, be carried out without departing from the scope thereof. Accordingly, that scope is intended to be limited only by the scope of the appended claims.

The invention claimed is:

1. A three-point safety belt system including:
a tongue configured to receive portions of a safety belt assembly;
the safety belt assembly comprising a shoulder belt section and a lap belt section, the shoulder belt section including a hollow, generally flat first tube or tubular section, the first tube or tubular part configured to tear apart along a preferred region;
the shoulder belt section further including an inflatable air bag disposed within the first tubular part of the shoulder belt section and movable therewith, the air bag inflatable by inflation gas to extend and break the first tubular part as the air bag inflates from a stored condition to an inflated condition;
a web guide including a frame and a spool rotationally supported on the frame, the spool having a plurality of spokes extending perpendicularly to the direction the shoulder part section traverses the spool, wherein a void is created between adjacent spokes, the undulating profile of the inner layer material extendible within one or more voids as the shoulder belt section traverses over the spool of the web guide;
a first and second retractor;
the lap belt section extending from the tongue to the first retractor and the shoulder belt section extending from the tongue to the second retractor, each retractor configured to respectively retract the lap belt section and the shoulder belt section and to permit the extension or protraction of same and to lock;
the shoulder belt section further including an inflatable air bag disposed within the first tubular part of the shoulder belt section and movable therewith, the air bag inflatable by inflation gas generated by an inflator causing the air bag to extend and break the first tubular part as the air bag inflates from a stored condition to an inflated condition wherein the shoulder belt section when viewed in cross-section as it traverses the web guide, the first tubular part forms a top or outer layer of material and a bottom or inner layer of material with the air bag in a compact configuration therebetween, the outer layer of material generally in tension and having a smooth profile while portions of the inner layer of material are in compression and have an undulating profile.

2. A three-point safety belt system including:
a tongue configured to receive portions of a safety belt assembly;
the safety belt assembly comprising a shoulder belt section and a lap belt section, the shoulder belt section including a hollow, generally flat first tube or tubular part, the first tube or tubular part configured to tear apart along a preferred region;
a web guide;
a first and second retractor;
the lap belt section extending from the tongue to the first retractor and the shoulder belt section extending from the tongue to the second retractor, each retractor configured to respectively retract the lap belt section and the shoulder belt section and to permit the extension or protraction of same and to lock;
the shoulder belt section further including an inflatable air bag disposed within the first tubular part of the shoulder belt section and movable therewith, the air bag inflatable by inflation gas generated by an inflator causing the air bag to extend and break the first tubular part as the air bag inflates from a stored condition to an inflated condition; and wherein the air bag includes an inflatable second tubular portion or section which when uninflated is configured to lie flat, the second tubular portion or section including a first side that extends the length of the air bag to a bottom thereof, the second tubular portion or section includes a second side that extends partially the length of the air bag, the air bag includes a voluminous inflatable cushion extending from the second tubular portion or section below the second side of the second tubular section and further including a circular portion extending upward and located along side of the second tubular portion.

3. The system according to claim 2 wherein as the air bag is inflated the inflatable cushion extends from shoulder belt, inwardly toward the center of the passenger compartment.

4. The system according to claim 3 wherein the seat belt system is configured to extend about an occupant of a vehicle including the driver, and wherein the air bag is configured so that the cushion when inflating extends in front of the occupant between the occupant and a steering wheel.

5. The system according to claim 2 wherein the inflator is mounted to or is secured to the shoulder belt portion and movable with the shoulder belt section.

6. The system according to claim 5 wherein the inflator is mounted within the first tubular part or mounted external to the first tubular part or to another seat belt connected to the first tubular part.

7. The system according to claim 2, wherein the cushion is folded in an accordion manner toward the first side of the tubular section with the width of the folded cushion at or about the width of the tubular portion of the air bag.

8. A three-point safety belt system including:
a tongue configured to receive portions of a safety belt assembly;
the safety belt assembly comprising a shoulder belt section and a lap belt section, the shoulder belt section including a hollow, generally flat first tube or tubular part, the first tube or tubular part configured to tear apart along a preferred region;
a web guide;
a first and second retractor;
the lap belt section extending from the tongue to the first retractor and the shoulder belt section extending from the tongue to the second retractor, each retractor configured to respectively retract the lap belt section and the shoulder belt section and to permit the extension or protraction of same and to lock;
the shoulder belt section further including an inflatable air bag disposed within the first tubular part of the shoulder belt section and movable therewith, the air bag inflatable by inflation gas generated by an inflator causing the air bag to extend and break the first tubular part as the air bag inflates from a stored condition to an inflated condition; and wherein the air bag includes an elongated, generally straight inflatable second tubular portion, part or section on one side thereof which when uninflated is configured to lie flat, the second tubular portion having an inlet end, the second tubular portion when laid flat having a first and second side extending from the inlet end, the first side being closed and extending to a bottom of the bag, the second side extending partially toward the bottom of the bag, the air bag further including a cushion portion extending from the second side of the second tubular portion, the air bag is closed to retain inflation gas enabling the air bag to inflate, except for the inlet end of the second tubular portion that is configured to be connected to the inflator wherein the cushion portion extends upward from the bottom of the bag, the cushion portion terminating in a circular section which has a circular profile when the bag is uninflated, an exterior side of the circular section joining the second side of the second tubular portion, the cushion portion including a relatively straight third side extending from the bottom to and edge of the circulation portion, and wherein the circular portion is situated spaced from and along side of the second tubular portion.

9. The system according to claim 8 wherein the inflator is mounted to a mounting surface or is secured to the shoulder belt portion and movable with the shoulder belt section.

10. The system according to claim 8 including a band of material joins the first and third sides, the band of material configured to be placed in tension as the air bag inflates.

11. The systems according to claim 10 wherein the band of material is oriented at an angle to both the first and second sides.

12. The system according to claim 10 wherein the band of material is located below the circular portion.

13. The system according to claim 8 wherein the second tubular portion lies along a first axis that extends to the bottom of the bag, the center of the circular portion located on a second axis, the second axis intersecting the first axis at an acute angle.

14. The system according to claim 8 wherein the second tubular portion lies along a first axis that extends to the bottom of the bag, the center of the circular portion located on a second axis, the second axis intersecting the first axis at an angle of less than 90 degrees.

15. The system according to claim 13 further including a non-inflatable portion situated along the second axis.

* * * * *